United States Patent [19]

Snell

[11] Patent Number: 5,383,091
[45] Date of Patent: Jan. 17, 1995

[54] GRIP AND PROTECTIVE CASING FOR CELLULAR TELEPHONE

[75] Inventor: Rusty B. Snell, Hawthorne, N.J.

[73] Assignee: Sony Electronics, Inc., Park Ridge, N.J.

[21] Appl. No.: 20,418

[22] Filed: Feb. 22, 1993

[51] Int. Cl.$^6$ ............................................. H05K 5/00
[52] U.S. Cl. ............................. 361/679; D14/251; D14/253; 150/154; 150/165; 206/305; 206/320; 206/521; 235/1 D; 235/145 R; 361/732; 361/740; 379/446; 379/451; 379/449; 379/455; 455/90; 455/100; 455/344; 455/348
[58] Field of Search ............... D14/137, 138, 193, 250, D14/251, 253; 379/426, 433, 446, 452, 437, 451, 440, 449, 454, 455; 455/89, 90, 100, 344, 346-349, 351; 361/380, 417, 419, 420, 422, 728-732, 740; 235/1 D, 145 R; 206/305, 320, 521, 523, 586, 592; 150/165, 154

[56] References Cited

U.S. PATENT DOCUMENTS

| | | | |
|---|---|---|---|
| 1,403,811 | 1/1922 | Pauly | 379/433 |
| 4,020,527 | 5/1977 | O'Neill. | |
| 4,299,344 | 11/1981 | Yamashita et al. | 455/351 |
| 4,325,142 | 4/1982 | Nakazawa | 455/351 |
| 5,253,292 | 10/1993 | Fluder et al. | 379/446 |
| 5,265,720 | 11/1993 | Meliconi | 206/305 |

FOREIGN PATENT DOCUMENTS 0085949 4/1991 Japan .................................. 379/433

OTHER PUBLICATIONS

SCP advertisement, Mobile Product News, Sep. 1992.
"Foam Phone", Fortune, Jan. 11, 1993, p. 87.

Primary Examiner—Gregory D. Thompson
Attorney, Agent, or Firm—Hill, Steadman & Simpson

[57] ABSTRACT

A hand-held electronic telecommunications device is provided with a grip and protective casing made of elastomeric material for covering the back face and side walls of the device. The casing is provided with finger recesses on its exterior surface to permit the operator to reliably hold and even operate the device with one hand. The casing is constructed so as to be readily applied and even removed, as desired, by the operator himself. The manner by which the casing is supported on the device enables the casing material to avoid having to cover over any area of the front, operational face of the device, where such features as the ear piece, mouthpiece and push buttons are located.

18 Claims, 2 Drawing Sheets

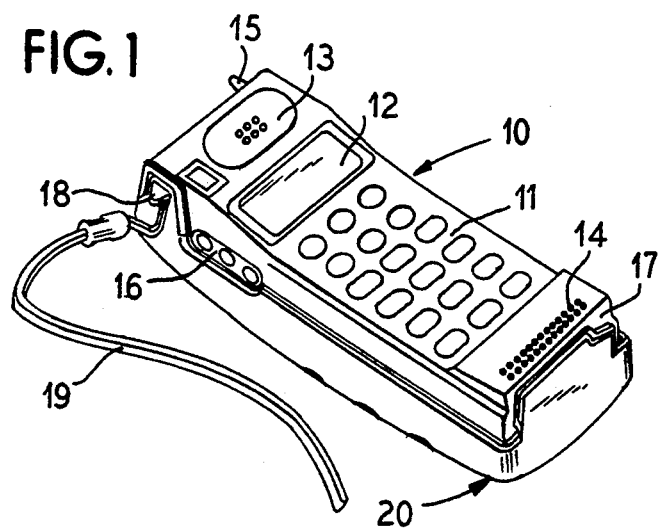
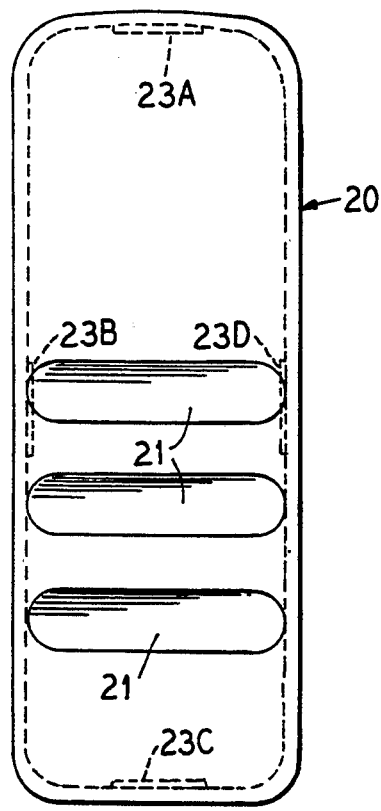
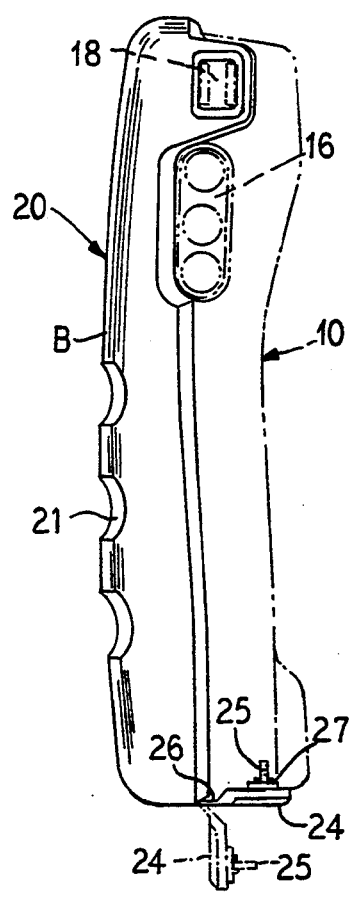
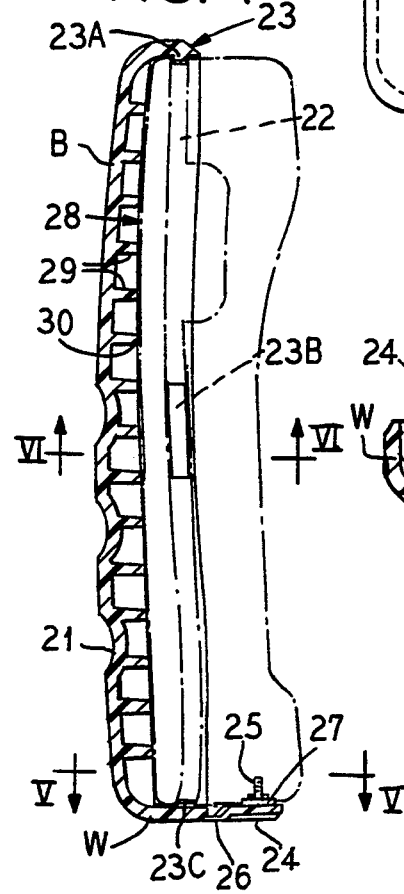
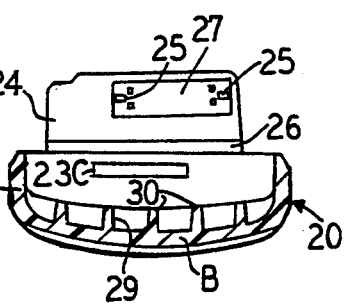

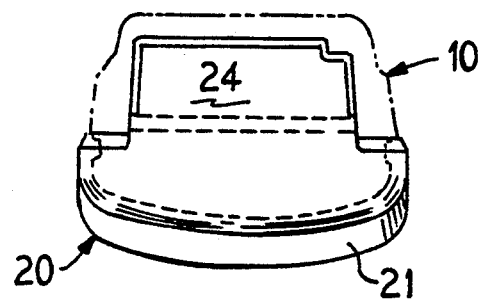
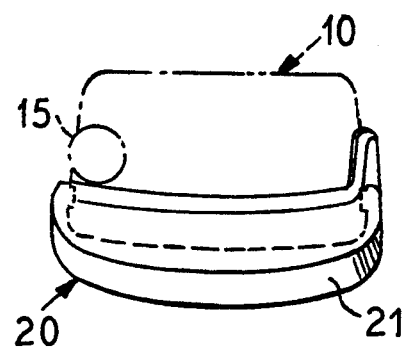
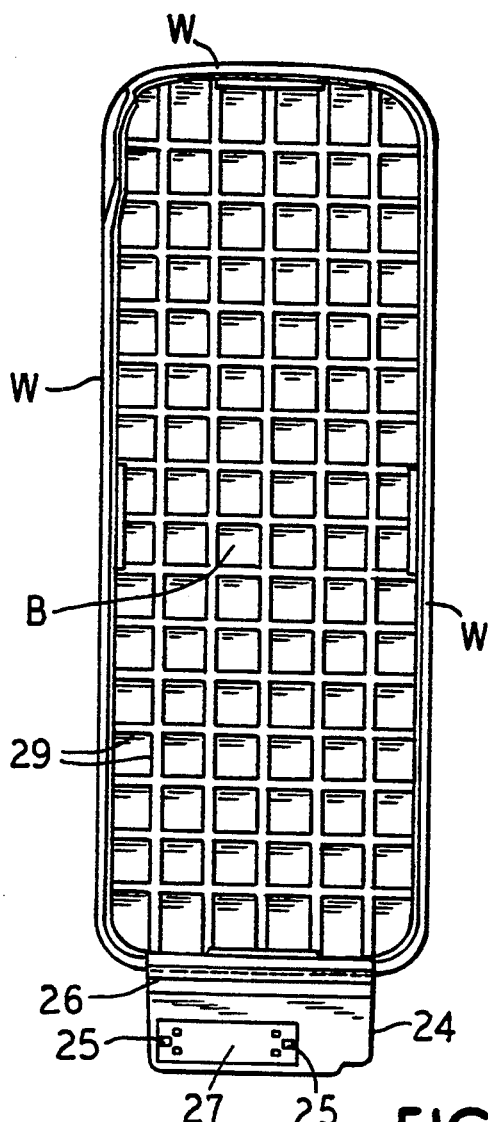
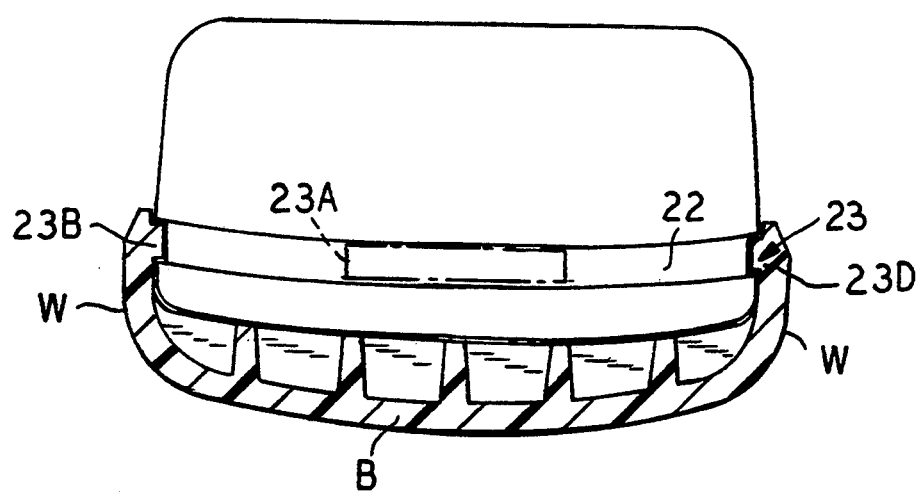

GRIP AND PROTECTIVE CASING FOR CELLULAR TELEPHONE

BACKGROUND OF THE INVENTION

The invention relates to hand-held telecommunication products, such as cellular telephones, and concerns a removable grip and protective casing specially adapted for use therewith.

Hand-held telecommunication products, such as cellular telephones or radios are in widespread use. These portable devices typically have a smooth plastic molded housing which is held with one hand during use. The housing has a front operational face with sensorial features with which the user interfaces, such as a mouthpiece, speaker or earpiece, and push buttons, an opposed back face, and housing walls between the front and back faces. The design of the devices and the housing material involved can make grippability problematic, and also make the devices prone to becoming scratched or scratching the surfaces on which the device is set. In order to curb such instances, a previously known accessory item sold for use with cellular telephones or other electronic telecommunication products has been a leather case or "boot" designed for a glove-like fit on the product housing, overlying, in whole or in part, both faces and the walls of the product. Such boots require some free space on the front face of the product which can be covered over by the boot material. Such boots are difficult for the user to remove, if desired.

SUMMARY OF THE INVENTION

The present invention is directed to a detachable grip and protective casing made of elastomeric material, such as rubber, constructed to fit over only the back face and sides of a cellular telephone device, or other telecommunications product. The casing is formed with at least one securement member for fitting in a recess on the product housing. One such securement member is in the form of a flap having prongs for force-fit engagement in the jack recess on an end of the phone. The flap is pivotable, thereby enabling the operator to unlock the casing and then continue pulling the casing off the phone until it is completely removed.

The casing is formed on its exterior surface with finger recesses to improve grippability. By virtue of the grippability of the product being improved, the user is better able to operate the device with only one hand, that is, holding the device with the fingers and activating the buttons with the thumb of the same hand.

BRIEF DESCRIPTION OF THE DRAWINGS

FIG. 1 is a perspective view of the casing invention in use with a portable, cellular telephone.

FIG. 2 is a plan view showing the exterior surface of the casing invention.

FIG. 3 is a side elevational view of the casing invention as applied on the cellular telephone.

FIG. 4 is a cross-sectional, side view of the casing invention as applied on the cellular telephone.

FIG. 5 is a cross-sectional view taken along the lines V—V of FIG. 4.

FIG. 6 is a cross-sectional view taken along the lines VI—VI of FIG. 3.

FIG. 7 is a top view of the casing as applied to the cellular telephone.

FIG. 8 is a bottom view of the casing as applied to the cellular telephone.

FIG. 9 is a plan view showing the interior surface of the casing.

DESCRIPTION OF THE PREFERRED EMBODIMENT

With reference to FIG. 1, there is illustrated a hand-held, portable cellular telephone 10 of typical construction, having a front operational face with a push button area 11 and display screen 12 disposed between an earpiece 13 and mouthpiece 14. The telephone 10 is generally box-shaped having a smooth back face (not shown), an upper end wall from which a collapsible antenna 15 extends, a pair of opposed side walls with a bank of connector holes 16 formed in one such side wall, and a bottom end wall 17 containing a typical rectangular-shaped jack recess (not shown). The telephone 10 is formed with a bracket 18 which protrudes from the side wall and onto which may be latched a wrist strap 19, such as shown here, for carrying the telephone during periods when not in use.

The telephone 10 is fitted with a grip and protective casing 20 made of elastomeric material, such as rubber. As further apparent from the figures, the casing 20 is generally formed by a base B and a continuous wall surface W which is upstanding from the base. The casing 20 has an open top. The casing 20 serves to cover the entire backface of the telephone and partially its side walls and end walls, but avoids overlying any surface on the front face. The casing construction and material serves to prevent scratching of the telephone device, in addition to scratching of surfaces the telephone is set on, and also serves to cushion the telephone against impact when it is set down. Additionally, as shown in FIG. 2, the exterior surface of the casing base B is formed with a series of finger receiving recesses 21 disposed to enable the user to reliably grip the telephone contained by the casing 20, and thereby leave the user's thumb free to activate the buttons, while supporting the telephone with only one hand.

With reference to FIGS. 3 and 7, it will be seen that the casing 20 is formed with cut-outs and cut-aways to provide exposure therethrough or therealong of such side wall and end wall fixtures as the antenna 15, the bracket 18, and the bank of connector holes 16.

The casing 20 is specially constructed such that the individual user can personally secure the casing to his cellular telephone, and likewise remove the casing as desired. The cellular telephone 10, as is typical, has its housing formed from two front and back pieces fitted together across a longitudinal parting line which runs along the side walls and end walls of the telephone. At the parting line, a recess area 22, as shown in FIGS. 4 and 6, is formed on the telephone housing. The back piece of the telephone housing is thus wholly contained within the casing 20, and the upstanding surfaces of the casing 20, which serve to cover the side walls and end walls of the telephone 10, are formed with an inwardly projecting securement member 23 which fits in the recess 22 along the parting line on the telephone. The securement member 23 may be in the form of a continuous protuberance corresponding for engagement into a likewise continuous recess formed on the telephone housing. However, in accordance with the preferred embodiment, individual protuberance members 23a, 23b, 23c, and 23d are formed at intervals along the interior of the upstanding wall surface W of the casing 20 to support the casing on the telephone by virtue of their engagement in the parting line recess 22.

Also for securement of the casing 20 to the cellular telephone 10, the upstanding wall surface of the casing 20 is provided with a further upstanding extension piece in the form of a flap 24 which is formed with locking prongs 25. As shown in FIGS. 3-5 and 8-9, the flap 24 is made of the same elastomeric material as the remainder of the casing 20. The flap 24 is pivotable relative to the upstanding wall portion of the casing to which it is attached by virtue of a relatively thinned or weakened section of the elastomeric material which serves as a hinge line 26.

The locking prongs 25 are formed on a plate 27 suitable affixed to the interior wall surface of the flap 24 and project outwardly therefrom. The prongs 25 are situated on the plate 27, such that they frictionally engage the side wall surfaces of the jack recess on the cellular telephone 10 and thus serve to lock the casing to the telephone housing. The prongs 25, as well as the plate 27, may be made of metal. However, the prongs 25 are resilient, such that their press-fit in the telephone jack recess is also detachable with pressure.

The casing 20 thus can be readily fitted onto a device, such as the cellular telephone 10, by the user himself, and also selectively removed, as desired.

The base surface of the casing 20, in which the finger recesses 21 are formed is also preferably provided with ribbing 28 upstanding from the interior surface of the base. The ribs 29 are preferably arranged in a crosshatched pattern facing the back face of the telephone housing. The various rib heights are sized such that the distal ends 30 of the ribs makes everywhere smooth surface contact with the back face of the telephone housing. The ribbing 28 serves to provide a further cushion effect between the exterior of the casing 20 and the back face of the telephone housing.

Although the invention has been described above particularly with respect to the preferred embodiment, it will be understood that the present disclosure has been made by way of example and that modification and variations still within the spirit of the invention are possible in light of the above teachings and would be considered within the ambit of this invention. For example, the casing may be made of an elastomeric material other than rubber, or the telecommunications device to which the grip and protective casing is affixed may not be limited to a cellular telephone.

I claim as my invention:

1. For use on a hand-held electronic telecommunications device defined by a housing having a front operational face with sensorial features with which the user interfaces, an opposed back face, and transversely extending side walls between said front and back faces, a grip and protective casing having a base and a continuous wall surface surrounding said base and upstanding inwardly from said base and having a securement member projecting inwardly from said wall surface for frictionally engaging at least one housing side wall of said telecommunications device, such that when applied to said telecommunications device housing said casing overlies said back face and all side walls but avoids contact with said front face.

2. The grip and protective casing of claim 1, wherein said casing is made of elastomeric material.

3. The grip and protective casing of claim 1, wherein said securement member is a protuberance, and a plurality of such protuberances are spaced along said wall surface of said casing.

4. The grip and protective casing of claim 1, wherein said securement member comprises a flap extending further upwardly from said wall surface and hingedly connected to said wall surface, said flap having a locking element for attaching to said telecommunications device housing.

5. The grip and protective casing of claim 4, wherein said locking element comprises resilient prongs.

6. The grip and protective casing of claim 4, wherein said locking element is adapted to be releasably attached to said telecommunications device housing.

7. The grip and protective casing of claim 1, wherein the exterior surface of said base is formed with finger receiving recesses.

8. The grip anti protective casing of claim 1 or 7, wherein the interior surface of said base is formed with inwardly upstanding ribs for supporting said base above said back face when said casing is applied to said telecommunications device housing.

9. A combined hand-held electronic telecommunications device and grip therefor, comprising:
    telecommunications device housing having a front operational face with sensorial features with which the operator interfaces, an opposed back face, and transversely extending side walls between said front and back faces;
    casing having a base, a continuous wall surface surrounding said base and upstanding from said base and an open top into which said back face is received; and
    a securement member projecting inwardly from said casing wall surface for frictionally engaging at least one side wall of said telecommunications device housing, such that said casing overlies said back face and all side walls but avoids contact with said front face.

10. The combination of claim 9, wherein said telecommunications device housing is formed with a transversely extending recess, said securement member is a protuberance fit into said recess, and a plurality of such protuberances are spaced along said wall surface of said casing.

11. The combination of claim 9, wherein said securement member comprises a flap extending further upwardly from said wall surface and hingedly connected to said wall surface, said flap having a locking element for attaching itself to one said telecommunications device housing side wall.

12. The combination of claim 11, wherein said locking element comprises resilient prongs and said one telecommunications device housing side wall has an opening into which said prongs are received.

13. The combination of claim 12, wherein said telecommunications device is a cellular telephone and said opening contains a jack connection thereto.

14. The combination of claim 11, wherein said locking element releasably attaches to said one telecommunications device housing side wall.

15. A grip for a hand-held electronic telecommunications device comprising a base, a continuous wall surface upstanding from said base, and a fully open top; a flap pivotally connected to said wall surface for extending further upwardly therefrom; and a locking element disposed on said flap for projecting inwardly toward said base when said flap is upstanding.

16. The grip of claim 15, wherein said locking element comprises a pair of prongs.

17. The grip of claim 15, wherein said base has a plurality of ribs upstanding therefrom and disposed interior of said continuous wall surface, some of said ribs running lengthwise and others of said ribs running transversely relative to said base.

18. The grip of claim 15, wherein said base exterior surface is formed with finger receiving recesses.

* * * * *